(12) United States Patent
Hao et al.

(10) Patent No.: US 10,699,449 B2
(45) Date of Patent: Jun. 30, 2020

(54) PIXEL-BASED TEMPORAL PLOT OF EVENTS ACCORDING TO MULTIDIMENSIONAL SCALING VALUES BASED ON EVENT SIMILARITIES AND WEIGHTED DIMENSIONS

(71) Applicant: Hewlett-Packard Development Company, L.P., Houston, TX (US)

(72) Inventors: Ming C Hao, Palo Alto, CA (US);
Dominik Jackle, Palo Alto, CA (US);
Nelson L Chang, San Jose, CA (US);
Wei-Nchih Lee, Palo Alto, CA (US);
Daniel Keim, Constance (DE)

(73) Assignee: Hewlett-Packard Development Company, L.P., Spring, TX (US)

( * ) Notice: Subject to any disclaimer, the term of this patent is extended or adjusted under 35 U.S.C. 154(b) by 94 days.

(21) Appl. No.: 15/544,675

(22) PCT Filed: Mar. 17, 2015

(86) PCT No.: PCT/US2015/021012
§ 371 (c)(1),
(2) Date: Jul. 19, 2017

(87) PCT Pub. No.: WO2016/148702
PCT Pub. Date: Sep. 22, 2016

(65) Prior Publication Data
US 2017/0365079 A1 Dec. 21, 2017

(51) Int. Cl.
*G06T 11/20* (2006.01)
*G06F 3/0484* (2013.01)
(Continued)

(52) U.S. Cl.
CPC ........ *G06T 11/206* (2013.01); *G06K 9/00536* (2013.01); *G06K 9/00557* (2013.01);
(Continued)

(58) Field of Classification Search
None
See application file for complete search history.

(56) References Cited

U.S. PATENT DOCUMENTS 5,581,664 A * 12/1996 Allen ............... G06N 5/04
706/46
7,103,222 B2 9/2006 Peker et al.
(Continued)

FOREIGN PATENT DOCUMENTS

CN 104067281 9/2014
WO WO-2013109731 7/2013

OTHER PUBLICATIONS

Labib K. et al.; "An Application of Principal Component Analysis to the Detection and Visualization of Computer Network Attacks"; University of California ~ 2004 ~ 14 pages.
(Continued)

*Primary Examiner* — Aaron M Richer
(74) *Attorney, Agent, or Firm* — Trop Pruner & Hu PC

(57) ABSTRACT

Similarities between events that include a plurality of dimensions are computed, the similarities computed based on binary comparisons between the events and based on user-specified weights for the dimensions. Multidimensional scaling (MDS) values are calculated based on the computed similarities between the events. A graphical visualization is generated of a temporal plot of the events, the temporal plot comprising a first axis corresponding to time, and a second axis corresponding to the MDS values, and the temporal plot representing overlapping time slices each containing pixels representing a respective subset of the events.

16 Claims, 9 Drawing Sheets

(51) Int. Cl.
  *G06Q 10/10* (2012.01)
  *G06K 9/68* (2006.01)
  *G06K 9/00* (2006.01)
  *G06K 9/62* (2006.01)
  *G06T 11/00* (2006.01)

(52) U.S. Cl.
  CPC ......... *G06K 9/6232* (2013.01); *G06K 9/6878* (2013.01); *G06Q 10/10* (2013.01); *G06F 3/04842* (2013.01); *G06F 3/04847* (2013.01); *G06K 2009/00738* (2013.01); *G06T 11/001* (2013.01)

(56) References Cited

U.S. PATENT DOCUMENTS

| | | | |
|---|---|---|---|
| 7,659,895 B2 | 2/2010 | Kandogan et al. | |
| 7,996,374 B1* | 8/2011 | Jones | G06Q 10/10 707/694 |
| 2004/0025044 A1 | 2/2004 | Day et al. | |
| 2004/0183518 A1* | 9/2004 | Weller | G01R 13/0254 324/76.58 |
| 2006/0036425 A1 | 2/2006 | Le Cocq et al. | |
| 2008/0126858 A1 | 5/2008 | Doyle | |
| 2010/0076785 A1 | 3/2010 | Mehta et al. | |
| 2012/0123232 A1 | 5/2012 | Najarian et al. | |
| 2013/0073562 A1* | 3/2013 | Dearman | G06F 17/30961 707/748 |
| 2013/0166346 A1* | 6/2013 | Al-Zuhair | G06Q 10/0635 705/7.28 |
| 2013/0290219 A1* | 10/2013 | DuBois | G06Q 40/06 705/36 R |
| 2014/0172574 A1* | 6/2014 | Iriyama | G06Q 30/0261 705/14.58 |
| 2014/0247973 A1 | 9/2014 | Moussavi et al. | |
| 2015/0111205 A1* | 4/2015 | Jones | G06F 19/20 435/6.11 |
| 2016/0180555 A1* | 6/2016 | Matsuo | G06T 11/206 345/440 |

OTHER PUBLICATIONS

Wolfram MathWorld, Iverson Bracket dated on or before Feb. 25, 2015 (1 page).

www.ueltschi.org, Shannon entropy, Chapter 6 printed Feb. 25, 2015 (8 pages).

* cited by examiner

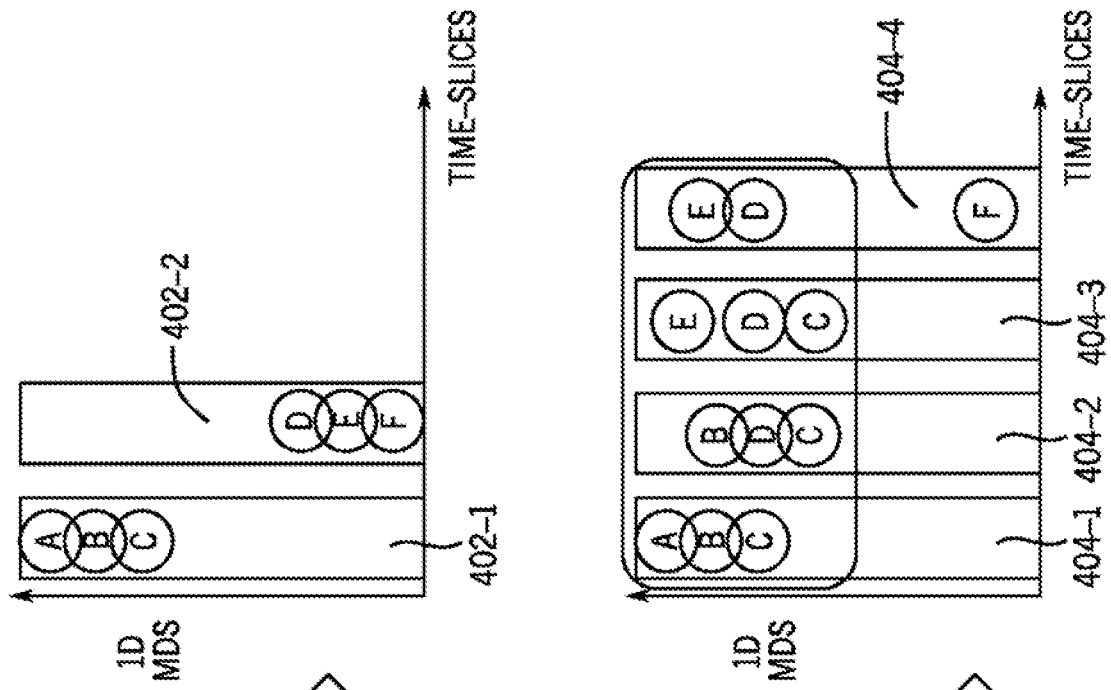
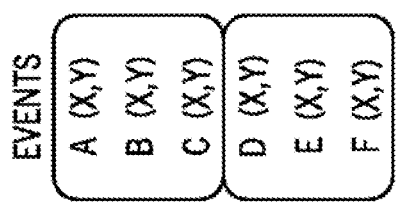
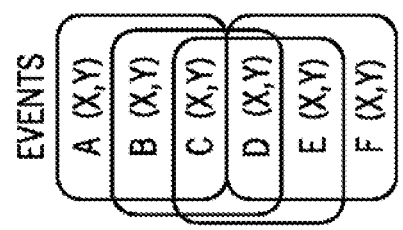
FIG. 4A
FIG. 4B

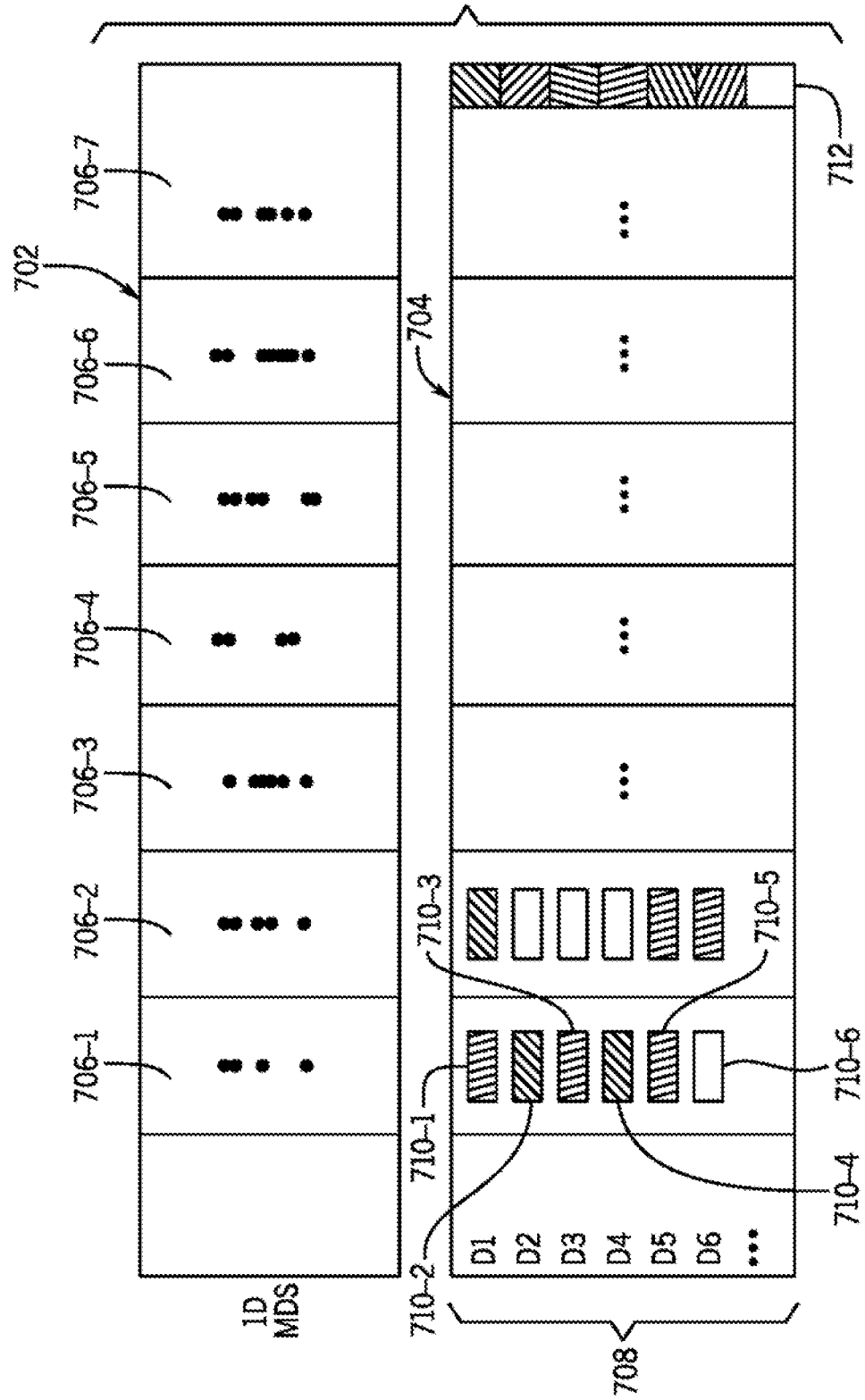

PIXEL-BASED TEMPORAL PLOT OF EVENTS ACCORDING TO MULTIDIMENSIONAL SCALING VALUES BASED ON EVENT SIMILARITIES AND WEIGHTED DIMENSIONS

BACKGROUND

A large amount of data can be produced or received in an environment, such as a network environment that includes many machines (e.g. computers, storage devices, communication nodes, etc.), or other types of environments. As examples, data can be acquired by sensors or collected by applications. Other types of data can include financial data, health-related data, sales data, human resources data, and so forth.

BRIEF DESCRIPTION OF THE DRAWINGS

Some implementations of the present disclosure are described with respect to the following figures.

FIGS. 4A and 4B are schematic diagrams illustrating example time slices, where each time slice includes a respective collection of events, according to some implementations.

FIG. 7 is a graphical visualization that includes an example temporal plot and a diversity matrix, according to some implementations.

DETAILED DESCRIPTION

Activity occurring within an environment can give rise to events. An environment can include a collection of machines and/or program code, where the machines can include computers, storage devices, communication nodes, and so forth. Events that can occur within a network environment can include receipt of data packets that contain corresponding addresses and/or ports, monitored measurements of specific operations (such as metrics relating to usage of processing resources, storage resources, communication resources, and so forth), or other events. Although reference is made to activity of a network environment in some examples, it is noted that techniques or mechanisms according to the present disclosure can be applied to other types of events in other environments, where such events can relate to financial events, health-related events, human resources events, sales events, and so forth.

Generally, an event can be generated in response to occurrence of a respective activity. An event can be represented as a data point (also referred to as a data record).

Each data point can include multiple dimensions (also referred to as attributes), where an attribute can refer to a feature or characteristic of an event represented by the data point. More specifically, each data point can include a respective collection of values for the multiple attributes. In the context of a network environment, examples of attributes of an event include a network address attribute (e.g. a source network address and/or a destination network address), a network subnet attribute (e.g. an identifier of a subnet), a port attribute (e.g. source port number and/or destination port number), and so forth. Data points that include a relatively large number of attributes (dimensions) can be considered to be part of a high-dimensional data set.

Finding patterns (such as patterns relating to failure or fault, unauthorized access, or other issues) in data points representing respective events can be difficult when there is a very large number of data points. For example, some patterns can indicate an attack on a network environment by hackers, or can indicate other security issues. Other patterns can indicate other issues that may have to be addressed.

In accordance with some implementations according to the present disclosure, pattern exploration based on similarities of events is performed. The similarity-based exploration of events allows users to search for a subspace (or specific group) of events that may be of interest (e.g. may relate to one or multiple issues). A similarity between events can be based on multiple user-defined dimensions, as well as weights (which can also be user-specified) assigned to the respective dimensions. Also, patterns can be found along more than one dimension.

Figure 1:
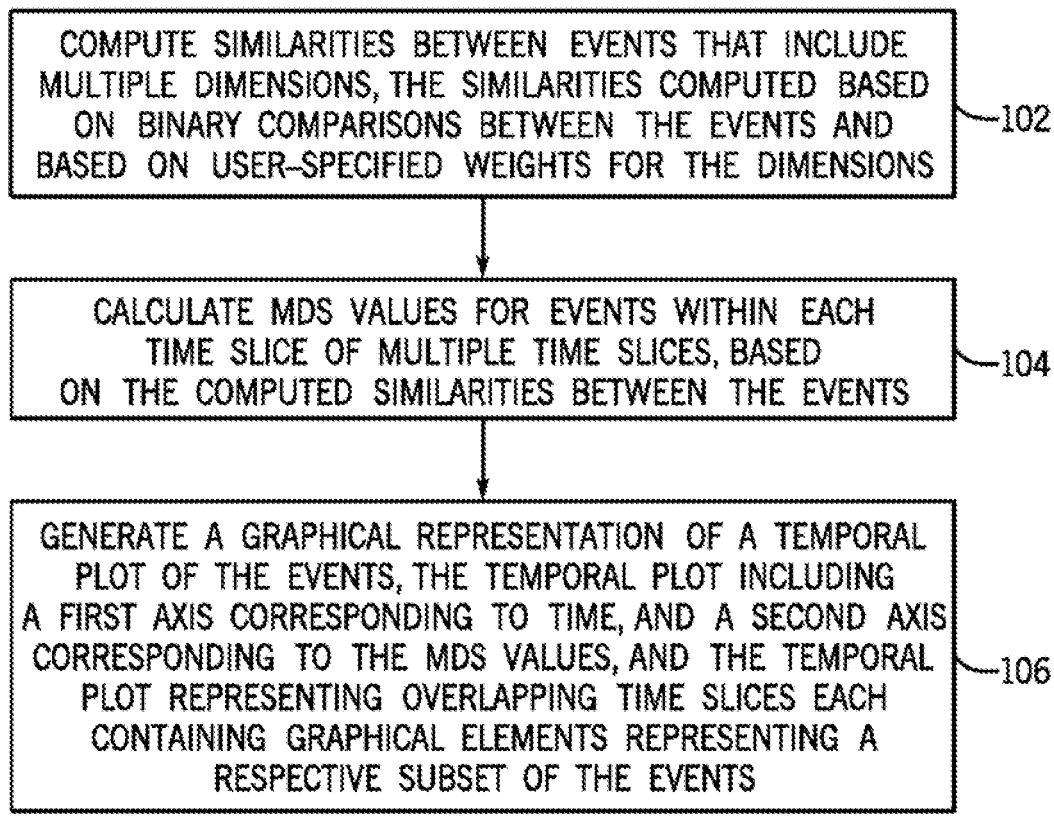
FIG. 1 is a flow diagram of an example process according to some implementations.

As shown in FIG. 1, an example process can be performed by a computer or arrangement of computers, or by a processor or arrangement of processors. The process computes (at 102) similarities between events based on binary comparisons between the events and based on user-specified weights assigned to respective dimensions of the events (or more specifically, dimensions of data points representing the events).

Similarities between events may be computed based on binary comparisons between the events rather than computations of Euclidean distances between the events. Categorical data (included in the data points representing events) is data that does not have numerical values, but rather, has values in different categories. An example of categorical data can include location data, where location can be identified by different city names (the categories). Thus, the categorical values of the location dimension (which is a categorical dimension) can include Los Angeles, San Francisco, Palo Alto, and so forth.

The binary comparison of two events (or more specifically two data points that represent the two events) is illustrated by Table 1 below. Note that the data points can include categorical data.

TABLE 1

|  | Dimension 1 | Dimension 2 | Dimension 3 |
|---|---|---|---|
| Event A | W | X | Z |
| Event B | W | Y | Z |
| Distance: | 0 | 1 | 0 |

In the example above, it is assumed that each of events A and B has three dimensions (dimension 1, dimension 2, dimension 3). For event A, the values of dimensions 1, 2, and 3 are W, X, and Z, respectively. For event B, the values of dimensions 1, 2, and 3 are W, Y, and Z, respectively.

A string comparison per dimension is performed between events A and B. For dimension 1, both events A and B share the same value; as a result, the similarity is high, and thus, the string comparison for dimension 1 outputs a binary value of 0. The same is also true for dimension 3, where events A and B both share the same value D. As a result, the distance between events A and B along dimension 3 is also assigned the binary value 0. However, for dimension 2, events A and B do not have the same value, and thus, the distance between events A and B along dimension 2 is assigned the binary value 1. The foregoing comparisons of the events along respective dimensions are referred collectively as binary comparisons, since the outputs produced by the comparisons include a collection of binary values indicated similarity or dissimilarity along respective different dimensions. In alternative examples where different comparison techniques are used, high similarity can be represented with the binary value 1, while low similarity (or dissimilarity) can be represented with the binary value 0.

More specifically, to compute the similarity value between two events A and B, the computation iterates through all dimensions starting at i=1 (first dimension) and ending at the number of dimensions dim. The computation can then use Iverson Bracket [ ] to compare the i-th dimension of the events A and B to each other. The Iverson Bracket [ ] is an example of the string comparison discussed above. Then the result, either 0 or 1, is multiplied with the weight w(i) at position i: w(i). To build the average (i.e. a weighted distance between events A and B), the computation sums the foregoing weighted values and divides by the number of dimensions (dim) as specified in the following equation:

$$sim(A, B) = \frac{\sum_{i=1}^{dim}[A(i) \neq B(i)] \cdot w(i)}{dim}. \quad \text{(Eq. 1)}$$

The similarity between events A and B is represented as sim(A,B) above.

The similarities between events computed at 102 involve many-to-many comparisons of categorical data of the events, where the many-to-many comparisons refer to comparisons of the individual dimensions of the events.

The process further calculates (at 104) multidimensional scaling (MDS) values for events within each time slice of multiple time slices. The computation of the MDS values uses the similarity values computed between pairs of events (as computed at 102). MDS is used for visualizing a level of similarity of individual events of a dataset. An MDS technique can place data points (in one or multiple dimensions) such that distances between the data points are preserved. In some examples, since the distance between events is determined along one direction, the calculated MDS values are considered one-dimensional (1D) MDS values. The computation of 1D MDS values can employ various techniques, including those described in Bryan F. J. Manly, "Multivariate Statistical Methods: A Primer, Third Edition," CRC Press, 2004, pp. 163-172.

A difference between MDS values of a pair of events indicates the respective similarity of the pair of events. In some implementations, the time slices are overlapping time slices, where a first time slice that overlaps with a second time slice can share at least one event—in other words, the shared event is in both the first and second time slices. Use of overlapping time slices can improve stability of the analysis of the events. Moreover, as discussed further below, use of overlapping time slices can provide for a representation of temporal relations of the events in the different time slices.

The process generates (at 106) a graphical visualization of a temporal plot, where a first axis (e.g. horizontal axis) of the temporal plot represents time, and a second axis (e.g. vertical axis) of the temporal plot represents MDS values (or more specifically 1D MDS values in some examples). The MDS values indicate similarity between events. An example of a temporal plot is temporal plot 502 shown in FIG. 5. Graphical elements (e.g. in the form of dots or circles) in the temporal plot represent respective events. In the ensuing discussion, the graphical elements provided in a temporal plot are referred to as "pixels," where each pixel represents a respective event. The position, within the temporal plot, of each pixel representing a respective event is based on the respective 1D MDS value and the respective time value of the respective event.

The temporal plot represents the overlapping time slices, where each time slice in the temporal plot contains pixels representing a respective subset of the events.

Figure 2:
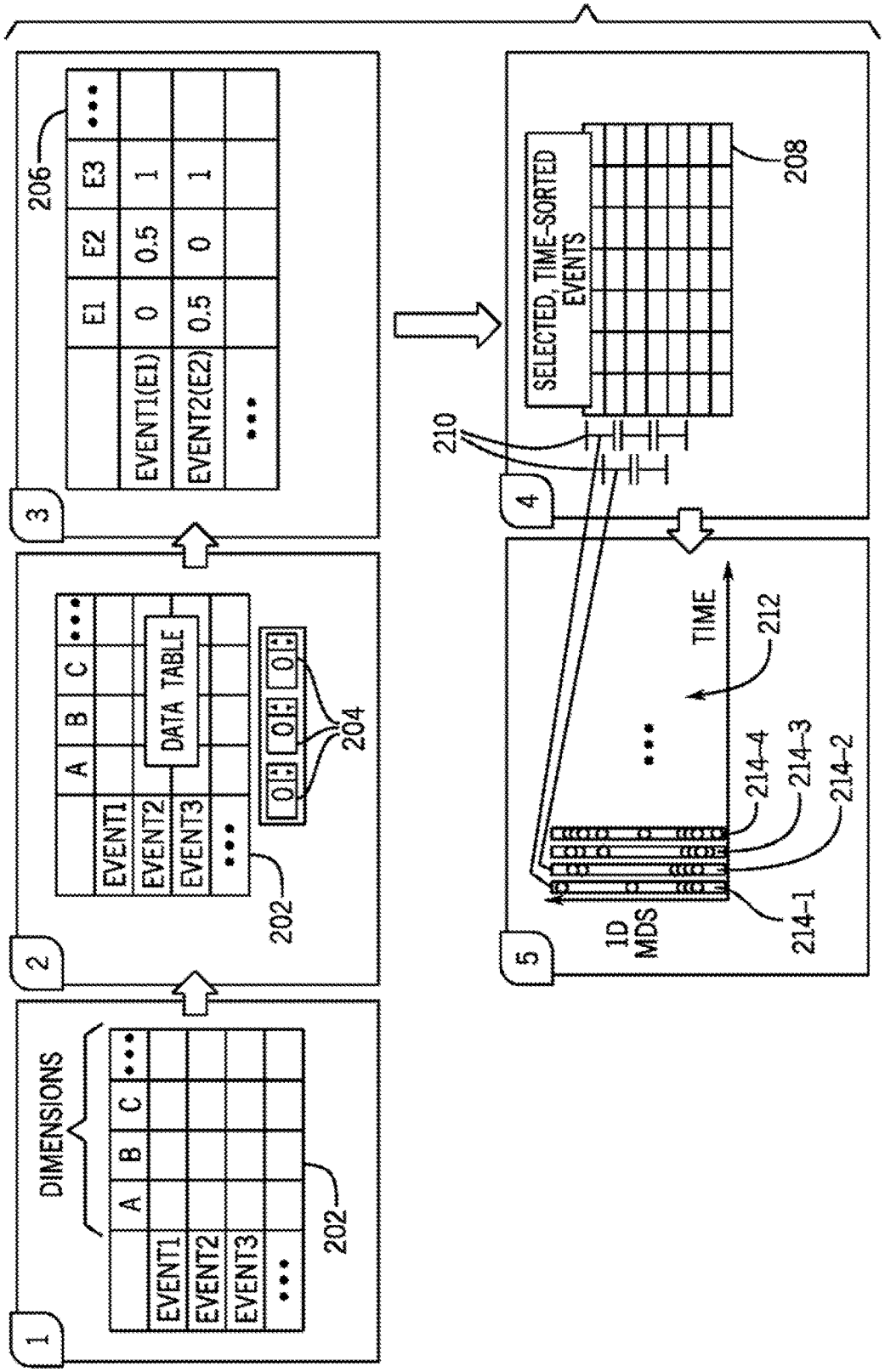
FIG. 2 is a schematic diagram illustrating various example tasks that are performed to produce a temporal plot according to some implementations.

FIG. 2 illustrates various example specific tasks (1-5) that correspond to the process of FIG. 1, according to some implementations. Task 1 constructs an input data table 202 of events, where each row of the data table 202 corresponds to a respective different event (events 1, 2, 3 depicted in FIG. 2), and each column represents a respective different dimension (e.g. A, B, C depicted in FIG. 2). As a more specific example, the dimensions of the respective events can include time, Internet Protocol (IP) address, port, protocol, and so forth.

Task 2 in FIG. 2 includes assigning weights (204) to the respective dimensions A, B, and C in the data table 202. Each weight can be specified by a user. The weights assigned to respective dimensions can be based on knowledge of domain experts who can specify which dimensions are more relevant to a specific issue (e.g. security attack of a network environment) that is of interest to a user.

Task 3 includes creating a distance matrix 206, where the distance matrix 206 includes rows corresponding to different events, and columns corresponding to different events. For example, row 1 corresponds to event 1 (E1), row 2 corresponds to event 2 (E2), and so forth. Column 1 corresponds to event 1 (E1), column 2 corresponds to event 2 (E2), and column 3 corresponds to event 3 (E3), and so forth.

Each cell in the distance matrix 206 includes a similarity value (a weighted distance as computed according to Eq. 1) between a pair of events. More generally, the computation of each similarity value between a pair of events is based on binary comparisons that consider weights assigned to respective dimensions.

Task 4 includes defining time slices 210 for a sorted matrix 208 of events, in which the events are sorted according to time (e.g. increasing time or decreasing time). As depicted in FIG. 2, each time slice 210 overlaps at least one other time slice 210.

Task 5 includes producing a graphical visualization including a temporal plot 212 that includes pixels representing events, where the position of each pixel in the temporal plot 212 is based on the respective 1D MDS value and time value of the event represented by the respective pixel. Since the temporal plot 212 plots 1D MDS values of events with respect to time, the temporal plot 212 can be referred to as a 1D MDS plot.

As shown in FIG. 2, the temporal plot 212 is divided into multiple overlapping time slices, represented as 214-1, 214-2, 214-3, 214-4, and so forth. The overlapping time slices in the temporal plot 212 generated in Task 5 correspond to the overlapping time slices 210 defined in Task 4.

Each time slice 214-$i$ ($i$=1, 2, . . . ) includes a subset of pixels that represent events in the respective time slice. Since the time slices 214-1, 214-2, . . . , are overlapping time slices, time slices can share at least one event. For example, time slices 214-1 and 214-2 can share at least one event that is within the time slices 214-1 and 214-2. Note that more than two time slices can share an event.

Figure 3:
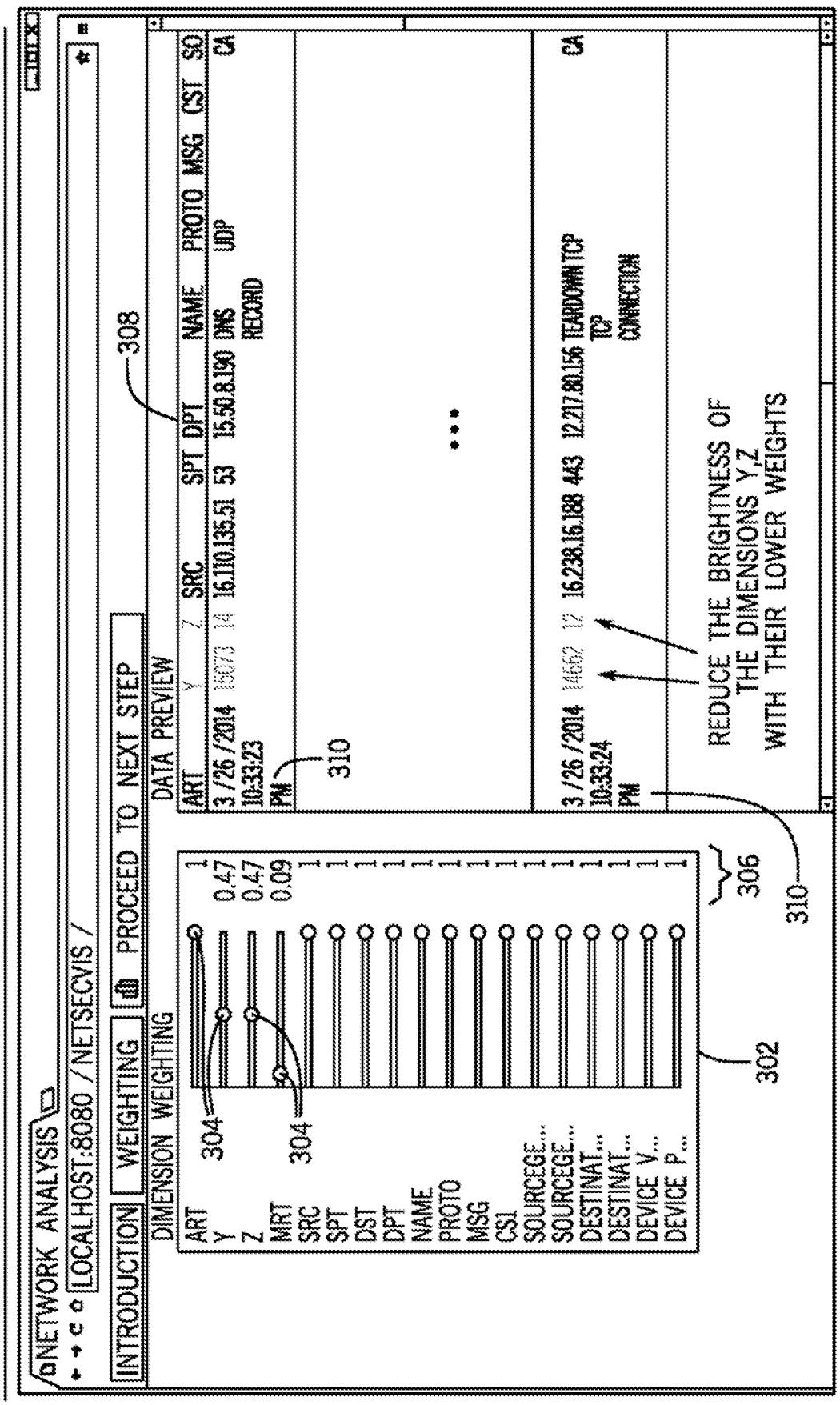
FIG. 3 depicts an example visualization screen to allow for user selection of weights to be assigned to dimensions of events, according to some implementations.

FIG. 3 is a schematic diagram of an example graphical user interface (GUI) screen that allows a user to specify weights for respective dimensions. In other examples, other types of user interfaces can be provided to allow a user to assign weights to dimensions. Various dimensions (e.g. ART, Y, Z, MRT, etc.) are listed in a dimension weighting region 302 of the GUI screen. Next to each listed dimension is a respective user-actuatable control button 304 that can be laterally moved left or right to adjust the weighting of the corresponding dimension. Movement of the control button 304 causes adjustment of the weight to a value between 0 and 1 (or some other range of values), as indicated in column 306 of the dimension weighting region 302. The value in column 306 for each dimension is based on the position of the respective control button 304.

The control buttons 304 can be user-adjusted to assign greater weights to some dimensions and lower weights to other dimensions.

The GUI screen of FIG. 3 also includes a data preview region 308, which includes entries 310 representing respective events. Each entry 310 includes values of various dimensions of these events. Each entry 310 in the data preview region 308 includes the values of respective dimensions for the corresponding event. Certain dimensions (e.g. Y and Z) that are associated with lower weights can be associated with lower brightness in the data preview window 308, as shown in FIG. 3.

FIG. 4A depicts events A, B, C, D, E, and F divided into two separate time slices 402-1 and 402-2 without overlap, such that the time slice 402-1 includes a first subset of events A, B, and C, while the time slice 402-2 includes a second subset of events D, E, and F, where the first and second subsets do not intersect (there are no common events in the first and second subsets).

FIG. 4B, on the other hand, defines the division of the events A, B, C, D, E, and F into overlapping time slices 404-1, 404-2, 404-3, and 404-4. Note that events B and C are shared by time slices 404-1 and 404-2; in other words, each of time slices 404-1 and 404-2 includes events B and C. Note that event C is also shared by time slice 404-3. Events C and D are shared by time slices 404-2 and 404-3. Events D and E are shared by time slices 404-3 and 404-4.

Figure 5:
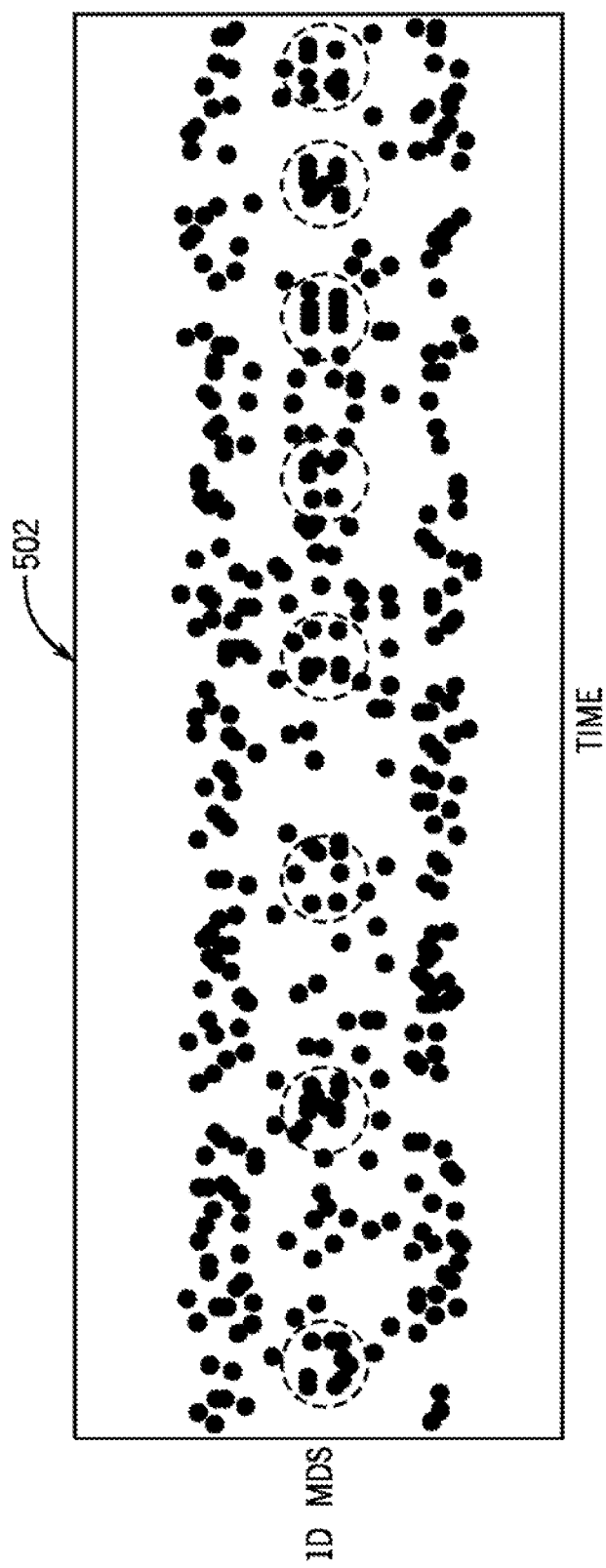
FIG. 5 is a graphical visualization depicting an example temporal plot that includes data points positioned in the temporal plot according to one-dimensional (1D) multidimensional scaling (MDS) values and time values, according to some implementations.

FIG. 5 shows an example graphical visualization that includes a temporal plot 502 of events, where pixels representing the events are positioned in the temporal plot 502, according to 1 D MDS values and time values of the respective events. Each point along the time axis represents a respective overlapping time slice. Note that the difference in 1D MDS values of a pair of events in each time slice represents the similarity of the two events.

Note that it is possible that multiple events can share a common pair of 1D MDS value and time value, and thus the multiple events would be mapped to the same position in the temporal plot 502. Note that such mapping to the same position can depend on the overall distribution of events and their values. Deviations of positions of a re-used event in a subsequent time slice are possible.

In some implementations, each pixel in the temporal plot 502 can also have a brightness associated with it, where the brightness of the pixel represents an event density associated with the pixel. The event density associated with a pixel indicates the number of events (which map to the same location in the temporal plot 502 because they share a common pair of an 1D MDS value and time value) represented by the pixel.

Dashed circles in the temporal plot 502 represent respective subspaces or patterns, where each subspace includes a number of pixels. As an example, the subspaces indicated by the dashed circles can correspond to port scans performed in a network environment, where each subspace includes pixels representing events that share a common destination IP address, but different ports. The highlighted subspaces allows for ease of detection of specific patterns that may be of interest to a user.

Figure 6A:
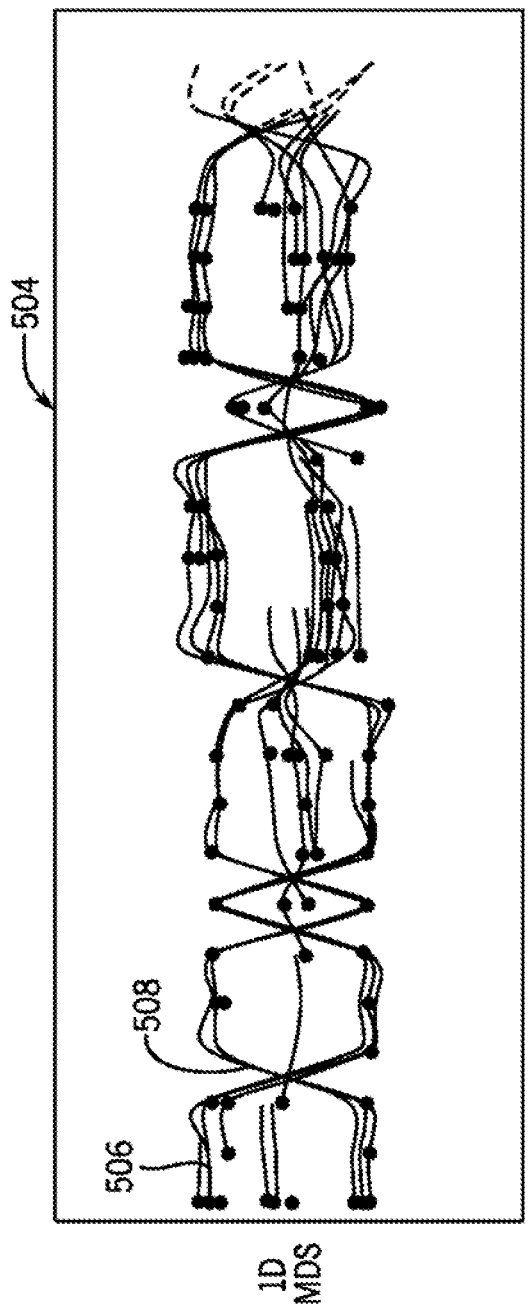
FIGS. 6A-6B are graphs illustrating examples of interconnecting lines between pixels representing events according to some implementations.

FIG. 6A shows interconnecting lines (e.g. 506 and 508) drawn between pixels in the temporal plot 504. Each interconnecting line represents "movement" of an event among time slices, and provides a representation of a temporal relation between time slices. As noted above, multiple time slices can share a given event, and thus pixels representing this given event would appear in the multiple time slices. For example, as shown in FIG. 4B, event C appears in time slices 404-1, 404-2, and 404-3, and thus an interconnecting line would be drawn to interconnect the pixels representing event C in the time slices 404-1, 404-2, and 404-3.

An interconnecting line that interconnects pixels in multiple time slices thus indicates that the event appears in the multiple time slices; such event would appear to "move" among the multiple time slices.

Because of the relatively high density of events and pixels representing such events, the interconnecting lines drawn in the temporal plot 504 of FIG. 6A can overlap each other (at least partially).

Figure 6B:
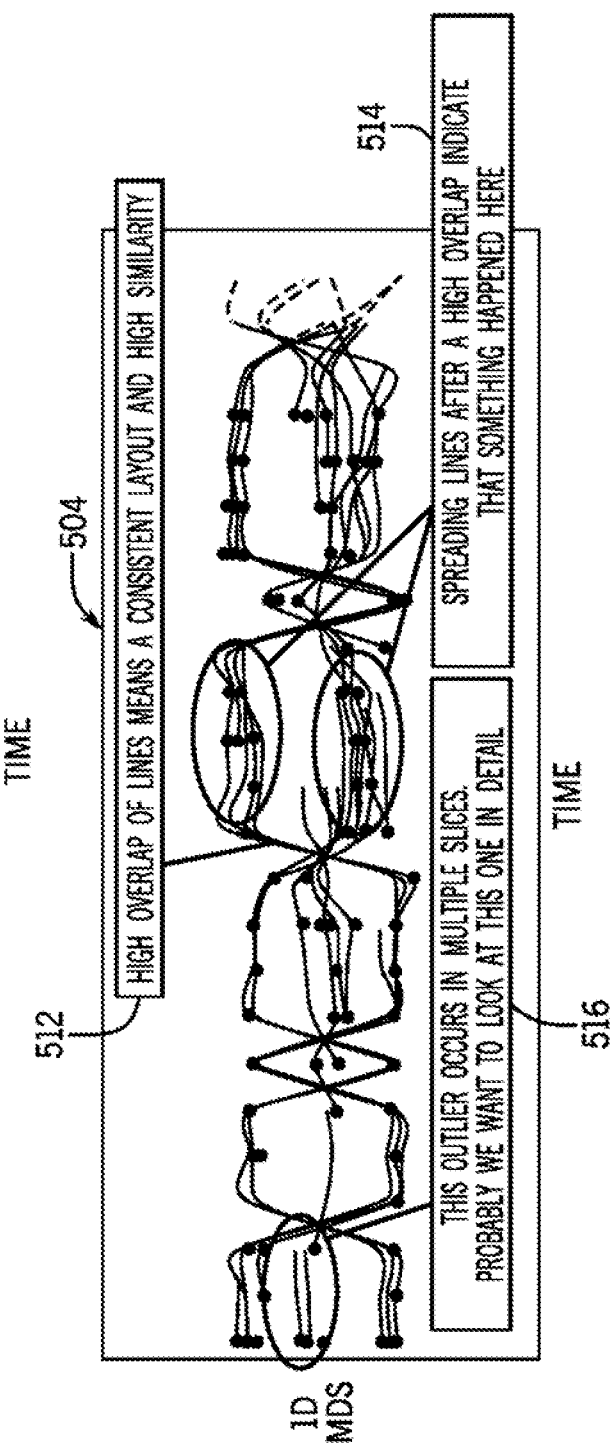

FIG. 6B depicts annotations 512, 516, and 514 regarding issues that can be represented by the interconnecting lines shown in FIGS. 6A and 6B. Annotation 512 points to a high overlap of interconnecting lines, which means that interconnecting lines for respective different events almost completely overlap each other in a time region. The high overlap of interconnecting lines can indicate that there is a consistent layout of events (these same events appear in the same multiple time slices) and high similarity between events.

Annotation 514 points to interconnecting lines that are spread out after the time region where there is high overlap of interconnecting lines (indicated by annotation 512). The spreading lines associated with annotation 514 after the high overlap associated with annotation 512 can indicate that an issue may have occurred during another time region in which the spreading lines are present.

Annotation 516 points to an outlier set of interconnecting lines, which can indicate another issue.

To provide further analysis of the events represented by a temporal plot (such as any of the temporal plots discussed above), computation of event diversity can be performed. Event diversity can be computed on a per-dimension basis. In some examples, the Shannon Entropy technique can be used to derive a diversity value of a dimension.

Diversity of values of a given dimension for a subset of events is computed as follows:

$$H = -\Sigma_i p_i \cdot \log_b(p_i),\quad\text{(Eq. 2)}$$

where $p_i$ represents the probability of a certain value i appearing within a given dimension (e.g. certain value of an IP address) of the subset of events.

Higher diversity indicates that the values of the given dimension are more spread apart, and thus can be more interesting to a user.

FIG. 7 shows an example graphical visualization that includes a temporal plot 702 and a diversity matrix 704. The temporal plot 702 includes pixels (e.g. dots or circles) that represent respective events. Multiple time slices 706-1, 706-2, 706-3, 706-4, 706-5, 706-5, 706-6, and 706-7 that are represented by the temporal plot 702, where each time slice includes pixels representing a respective subset of events.

In the diversity matrix 704, six dimensions D1, D2, D3, D4, D5, and D6 (708) are represented. The diversity of values of each dimension is computed and represented with a respective graphical element in the diversity matrix 704. For example, for the events represented in the time slice 706-1, six diversity values are computed for the respective six dimensions D1, D2, D3, D4, D5, and D6, according to Eq. 2.

These six diversity values are represented by respective graphical elements 710-1, 710-2, 710-3, 710-4, 710-5, and 710-6 in a corresponding column (corresponding to the time slice 706-1) in the diversity matrix 704. Note that the diversity matrix 704 has seven columns that correspond to the seven time slices in the temporal plot 702. Each column includes a respective set of six graphical elements representing the diversity values of the corresponding six dimensions of the events in the respective time slice.

The graphical element 710-1 represents the diversity of values of dimension D1 of the events in the time slice 706-1, the graphical element 710-2 represents the diversity of values of dimension D2 of the events in the time slice 706-1, the graphical element 710-3 represents the diversity of values of dimension D3 of the events in the time slice 706-1, and so forth.

Different diversity values are represented by different visual indicators, such as those represented in a scale 712. The different visual indicators can be different colors, different brightness, different fill patterns, or combinations of the foregoing. For example, different diversity values can be represented by different colors of different brightness. Thus, a higher diversity of a first dimension is represented by assigning a first visual indicator to a first graphical element in the diversity matrix 704, and a lower diversity of a second dimension is represented by assigning a second visual indicator to a second graphical element in the diversity matrix 704.

The diversity of the dimensions can approximate the eigenvalue ranking of the 1D MDS values of the events in a respective time slice, and thus can provide semantic insight of the events in the respective time slice. Areas of interest can be spotted visually, such as areas with high diversity values as indicated by graphical elements in the diversity matrix 704.

In the graphical visualization of FIG. 7, brushing and linking techniques can be applied. Brushing refers to selecting a subset of events for further analysis, such as a subset of events represented by the temporal plot 702. This selected subset of events can be linked to further information regarding the events of the subset. For example, the selected subset of events can be linked to corresponding graphical elements representing diversity values in the diversity matrix 704. Note that the selected subset of events can be less than all of the events in a given time slice, such that diversity values are computed and visualized based on just the selected subset of events.

As an example, a port scan (associated with a security attack of a network environment) can have high diversity on the port dimension (represented by a first visual indicator, such as a bright color, of a graphical element in the diversity matrix) and a low activity on the IP address dimension (represented by a second visual indicator, such as a dark color, of a graphical element in the diversity matrix).

Figure 8:
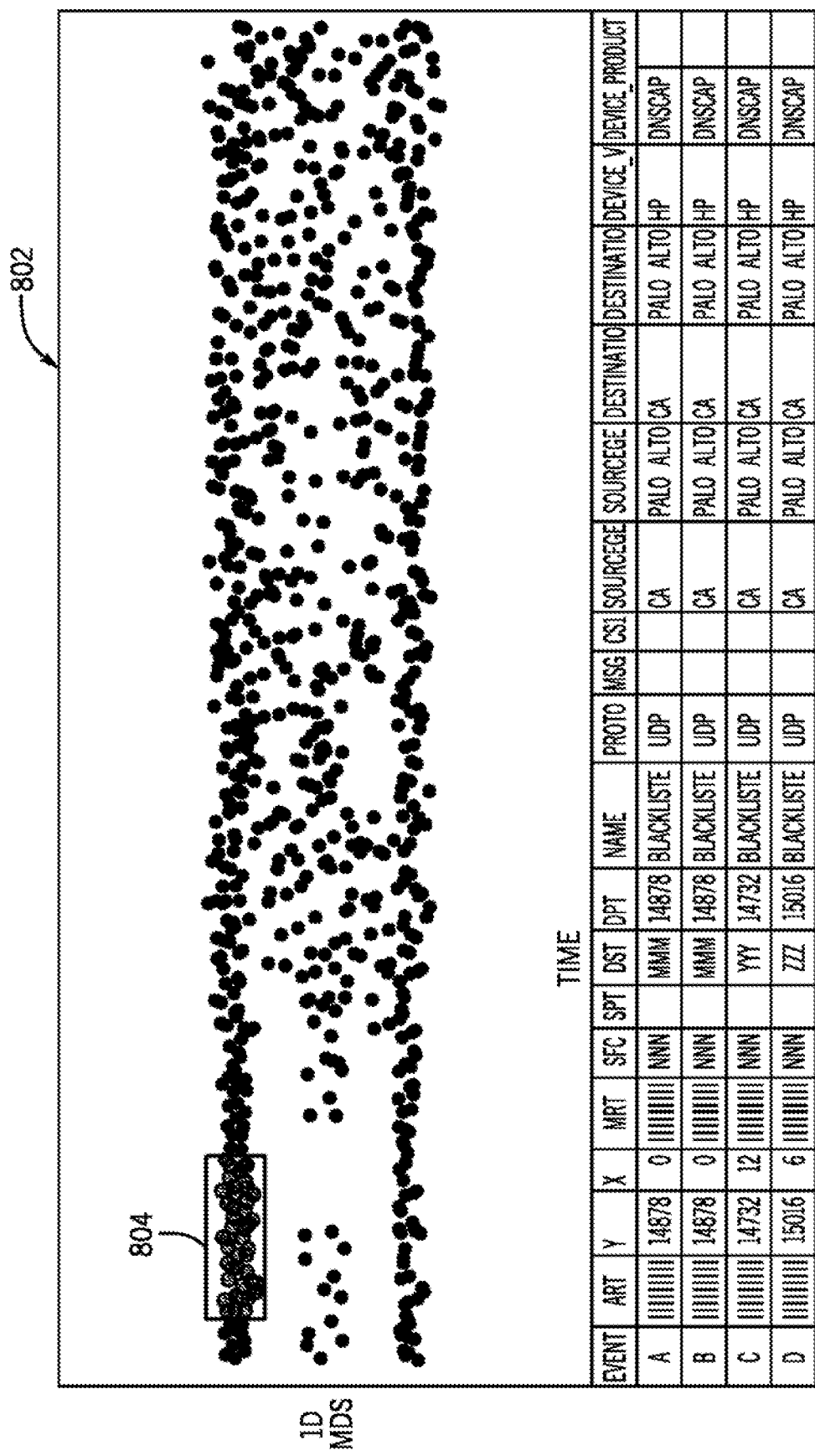
FIG. 8 is a visualization screen that includes an example temporal plot and detailed information relating to events selected in the temporal plot, according to further implementations.

FIG. 8 shows another example graphical visualization that depicts a temporal plot 802 that represents 1D MDS values of events as a function of time. In the temporal plot 802, a subspace 804 has been identified (e.g. selected by a user with an input device, such as a mouse, keyboard, touchpad, touchscreen, etc.). FIG. 8 provides an example of how a user can perform a search for a subspace of events that may be of interest to a user. The subspace 804 of events can include events that are similar to each other.

The graphical visualization of FIG. 8 also includes a text region 806 that includes detailed information for events represented in the subspace 804. The detailed information can include values of dimensions of the events represented in the subspace 804.

Using techniques or mechanisms according to some implementations, users can determine which events vary over time, and can also detect recurring patterns or changes in behavior of events over time.

In some implementations, a user can move a cursor over a pixel (e.g. mouse over the pixel by using a mouse device or other input device) of a temporal plot to view detailed information of the event represented by the pixel over which the cursor has been moved.

The user can review the detailed information of the event, and can compare the detailed information to that of another event.

Also, a user can iteratively assign different weights to dimensions, define different time slices, and cause generation of corresponding visualizations to refine the analysis of events in searching for interesting patterns or observations.

Figure 9:
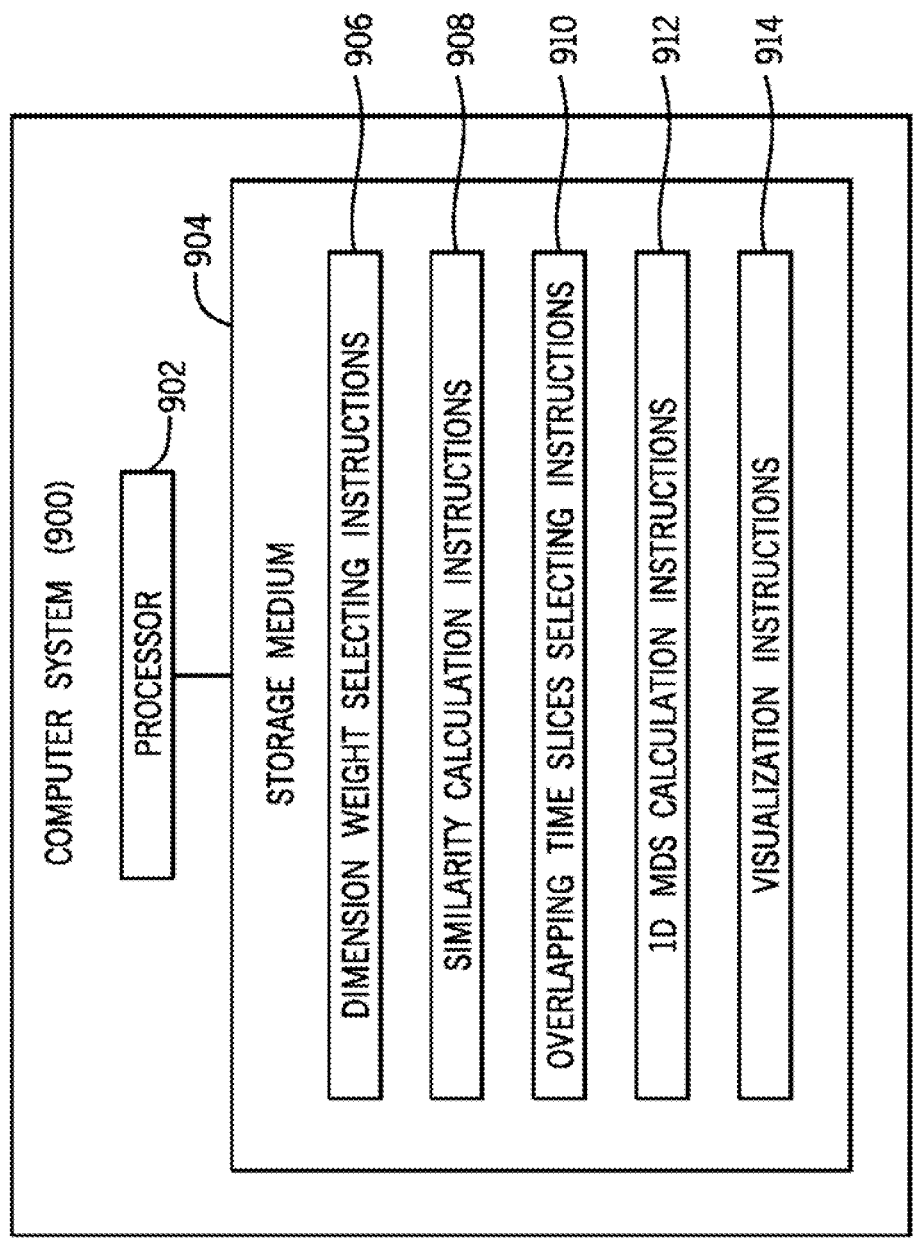
FIG. 9 is a block diagram of an example computer system according to some implementations.

FIG. 9 is a block diagram of an example computer system 900 according to some implementations. The computer system 900 includes a physical or hardware processor (or multiple processors) 902. A processor can include a microprocessor, a microcontroller, a programmable integrated circuit, a programmable gate array, or another physical processing device.

The processor(s) 902 can be coupled to a non-transitory machine-readable or computer-readable storage medium (or storage media) 904. The storage medium (storage media) 904 can store various machine-readable instructions, including dimension weight selecting instructions 906 (to select weights assigned to dimensions), similarity calculation instructions 908 (to calculate similarities such as according to Eq. 1), overlapping time slices selecting instructions 910 (to select overlapping time slices), 1D MDS calculation instructions 912 (to calculate 1D MDS values), and visualization instructions 914 (to generate various visualizations, such as those discussed above). The dimension weight selecting instructions 906 can assign weights based on user-entered weights (such as 204 in FIG. 2 or in response to actuation of the user-actuatable control buttons 304 of FIG. 3). The similarity calculation instructions 908 can calculate similarities as performed at 102 (according to Eq. 1, for example). The overlapping time slices selecting instructions 910 can select overlapping time slices, such as acceding to Task 4 in FIG. 2, to produce overlapping time slices as shown in FIG. 4B, for example. The 1D MDS calculation instructions 912 can compute 1D MDS values such as performed according to task 104 in FIG. 1. The visualization instructions 914 can generate visualizations such as those shown in FIGS. 5-8.

The storage medium (or storage media) 904 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   computing, by a system including a processor, similarities between events occurring within a network environment and that comprise a plurality of dimensions, the similarities computed based on binary comparisons between the events and based on user-specified weights for the dimensions;
   calculating, by the system, multidimensional scaling (MDS) values based on the computed similarities between the events;
   generating, by the system, a graphical visualization of a temporal plot of the events, the temporal plot comprising a first axis corresponding to time, and a second axis corresponding to the MDS values, and the temporal plot representing overlapping time slices each containing pixels representing a respective subset of the events;
   for each of the overlapping time slices, computing a diversity of each dimension of the plurality of dimensions, wherein a higher value of the diversity for a given dimension of the plurality of dimensions indicates that values of the given dimension are more spread apart; and
   identifying, by the system, security issues within the network environment from the graphical visualization.

2. The method of claim 1, wherein MDS values comprise one-dimensional MDS values.

3. The method of claim 1, further comprising:
   providing, in the graphical visualization, a respective graphical element representing the diversity of each dimension of the plurality of dimensions in a given time slice of the overlapping time slices.

4. The method of claim 3, further comprising:
   assigning different visual indicators to the respective graphical element to represent different diversity values.

5. The method of claim 4, wherein assigning the different visual indicators to the respective graphical element comprises assigning different colors of different brightness.

6. The method of claim 1, further comprising:
   presenting a graphical user interface listing the plurality of dimensions, the graphical user interface including control elements that are user-actuatable to specify the respective weights for the plurality of dimensions; and
   setting the respective weights for the plurality of dimensions in response to user actuation of the control elements.

7. The method of claim 1, wherein computing the similarities comprises computing weighted distances between the events based on the binary comparisons between individual dimensions of the events.

8. The method of claim 7, further comprising generating a distance matrix having rows corresponding to the events and columns corresponding to the events, wherein a cell of the distance matrix includes a value representing the weighted distance between a pair of the events.

9. The method of claim 1, further comprising:
   defining the overlapping time slices, wherein a first time slice of the overlapping time slices shares at least one event with a second time slice of the overlapping time slices.

10. The method of claim 1, further comprising:
    iterating among performing defining the overlapping time slices, assigning the user-specified weights, and generating the graphical visualization.

11. A system comprising:
    a processor to:
    compute, by a system including a processor, similarities between events occurring within a network environment and that comprise a plurality of dimensions, the similarities computed based on binary comparisons between the events and based on user-specified weights for the dimensions;
    calculate, by the system, multidimensional scaling (MDS) values based on the computed similarities between the events;
    generate, by the system, a graphical visualization of a temporal plot of the events, the temporal plot comprising a first axis corresponding to time, and a second axis corresponding to the MDS values, and the temporal plot representing overlapping time slices each containing pixels representing a respective subset of the events;
    for each of the overlapping time slices, compute a diversity of each dimension of the plurality of dimensions, wherein a higher value of the diversity for a given dimension of the plurality of dimensions indicates that values of the given dimension are more spread apart; and
    identifying, by the system, security issues within the network environment from the graphical visualization.

12. The system of claim 11, the processor further to:
    provide, in the graphical visualization, a respective graphical element representing the diversity of each dimension of the plurality of dimensions in a given time slice of the overlapping time slices.

13. The system of claim 11, the processor further to:
present a graphical user interface listing the plurality of dimensions, the graphical user interface including control elements that are user-actuatable to specify the respective weights for the plurality of dimensions; and
set the respective weights for the plurality of dimensions in response to user actuation of the control elements.

14. A non-transitory machine-readable storage medium comprising instructions for:
computing, by a system including a processor, similarities between events occurring within a network environment and that comprise a plurality of dimensions, the similarities computed based on binary comparisons between the events and based on user-specified weights for the dimensions;
calculating, by the system, multidimensional scaling (MDS) values based on the computed similarities between the events;
generating, by the system, a graphical visualization of a temporal plot of the events, the temporal plot comprising a first axis corresponding to time, and a second axis corresponding to the MDS values, and the temporal plot representing overlapping time slices each containing pixels representing a respective subset of the events;
for each of the overlapping time slices, computing a diversity of each dimension of the plurality of dimensions, wherein a higher value of the diversity for a given dimension of the plurality of dimensions indicates that values of the given dimension are more spread apart; and
identifying, by the system, security issues within the network environment from the graphical visualization.

15. The non-transitory machine-readable storage medium of claim 14, wherein computing the similarities comprises computing weighted distances between the events based on the binary comparisons between individual dimensions of the events.

16. The non-transitory machine-readable storage medium of claim 15, further comprising instructions for:
generating a distance matrix having rows corresponding to the events and columns corresponding to the events, wherein a cell of the distance matrix includes a value representing the weighted distance between a pair of the events.

* * * * *